United States Patent
Ko et al.

(10) Patent No.: US 8,964,640 B2
(45) Date of Patent: Feb. 24, 2015

(54) HYBRID BEACONING METHOD

(75) Inventors: Gwangzeen Ko, Seoul (KR);
Moon-Won Lee, Daejeon (KR);
Sung-Jin You, Daejeon (KR);
Sung-Hyun Hwang, Daejeon (KR);
Jung-Sun Um, Gyeonggi-do (KR);
Myung-Sun Song, Daejeon (KR);
Chang-Joo Kim, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 691 days.

(21) Appl. No.: 13/139,620

(22) PCT Filed: Dec. 15, 2009

(86) PCT No.: PCT/KR2009/007485
§ 371 (c)(1),
(2), (4) Date: Jun. 14, 2011

(87) PCT Pub. No.: WO2010/071337
PCT Pub. Date: Jun. 24, 2010

(65) Prior Publication Data
US 2011/0243089 A1 Oct. 6, 2011

(30) Foreign Application Priority Data
Dec. 17, 2008 (KR) .......... 10-2008-0128621

(51) Int. Cl.
*H04Q 7/00* (2006.01)
*H04W 48/08* (2009.01)
*H04W 88/06* (2009.01)

(52) U.S. Cl.
CPC .............. *H04W 48/08* (2013.01); *H04W 88/06* (2013.01)
USPC .................. 370/328; 370/338; 370/350

(58) Field of Classification Search
CPC .................................. H04W 76/045
USPC .................................. 370/329, 350
See application file for complete search history.

(56) References Cited

U.S. PATENT DOCUMENTS

| | | |
|---|---|---|
| 2003/0012167 A1 | 1/2003 | Benveniste |
| 2004/0253948 A1 | 12/2004 | Laberteaux |
| 2005/0030968 A1 | 2/2005 | Rich et al. |
| 2006/0193315 A1* | 8/2006 | Sinivaara et al. ............. 370/389 |
| 2007/0183360 A1* | 8/2007 | Arunan et al. ................ 370/328 |
| 2008/0112384 A1 | 5/2008 | Seo et al. |
| 2010/0173586 A1* | 7/2010 | McHenry et al. ............... 455/62 |

FOREIGN PATENT DOCUMENTS

| | | |
|---|---|---|
| CN | 1934827 | 3/2007 |
| WO | WO 2006/052221 A2 | 5/2006 |
| WO | WO 2006/052221 A3 | 5/2006 |
| WO | WO 2006/087677 A1 | 8/2006 |
| WO | WO2008/100078 A1 | 8/2008 |

OTHER PUBLICATIONS

International Search Report for PCT/KR2009/007485, Mailed Jan. 21, 2011.

* cited by examiner

*Primary Examiner* — Wanda Z Russell
(74) *Attorney, Agent, or Firm* — Staas & Halsey LLP

(57) ABSTRACT

Provided is a hybrid beaconing method in which a centralized beaconing scheme and a distributed beaconing scheme are combined. In the hybrid beaconing method, a beaconing scheme is converted according to a network condition, and a centralized beaconing scheme or a distributed beaconing scheme is used to maintain an optimum network status.

12 Claims, 5 Drawing Sheets

HYBRID BEACONING METHOD

CROSS REFERENCE TO RELATED APPLICATIONS

This application is a national phase application, under 35 U.S.C. 371, of international application No. PCT/KR2009/007485, filed on Dec. 15, 2009, which claimed priority to Korean Patent Application No. 10-2008-0128621, filed on Dec. 17, 2008, the disclosures of which are incorporated herein by reference.

TECHNICAL FIELD

The present invention relates to a beaconing method, and more particularly, to a hybrid beaconing method in a wireless personal area network (WPAN) based on a mesh network.

BACKGROUND ART

In general, in a wireless personal area network (WPAN), a beacon, which indicates network status information, is periodically transmitted to the whole or a part of the network in order to transmit network status of the WPAN or status of a predetermined device with another device in the WPAN. In a centralized beaconing scheme, a predetermined device that is defined in advance mainly transmits a beacon that manages the whole network. In a distributed beaconing scheme, all devices in the network transmit beacons. An example of the centralized beaconing scheme is the IEEE 802.15 based WPAN system, and an example of the distributed beaconing scheme is the Wimedia system based on ECMA-386 standards.

FIG. 1 is a schematic view of an example of a conventional centralized beaconing scheme, and FIG. 2 is a schematic view of an example of a conventional distributed beaconing scheme.

Referring to FIG. 1, in the conventional centralized beaconing scheme, a predetermined device that is defined in advance transmits a beacon that manages the whole network; here, a superframe 100 is divided into a beacon period section 110 and a data/control signal section 120, and a beacon B in the beacon period section 110 is transmitted by the predetermined device, that is, a network coordinator and other devices are conformably operated by a command of a beacon received by the network coordinator.

Referring to FIG. 2, in the conventional distributed beaconing scheme, all devices in a network transmit a beacon; that is, all devices sequentially transmit a beacon via a beacon period BP 160 to inform a network status thereof to other devices and also receive network status information of the other devices. In FIG. 2, for example, three devices transmit beacons 162, 164, and 166, respectively.

In the conventional distributed beaconing scheme, all devices transmit a beacon by turns. However, if the number of devices is increased, information may be repetitively transmitted, and a beacon period also is increased, which reduces data transmission time and thus reduces the total transmission efficiency. On the other hand, in the conventional centralized beaconing scheme in which only a predetermined device transmits a beacon, if there is a small number of devices, a hidden node is generated in a coverage in which each of the devices is included and thus it is difficult to efficiently control the network.

DISCLOSURE OF INVENTION

Technical Problem

The present invention provides a hybrid beaconing method which is used at a time when the efficiency of a conventional centralized beaconing scheme and a conventional distributed beaconing scheme has decreased, in order to compensate for disadvantages of each of the conventional centralized beaconing scheme and distributed beaconing scheme, thereby increasing the efficiency of the whole network.

Technical Solution

According to an aspect of the present invention, there is provided a method of transmitting a beacon in a case in which two networks are combined, the method comprising: selecting a predetermined device of one of the two networks as a network coordinator of the whole network in which the two networks are combined; and transmitting a beacon by the selected network coordinator via a beacon period to the two networks.

According to another aspect of the present invention, there is provided a method of transmitting a beacon in a case where a second network is combined as a neighbor network to a first network, the method comprising: allocating a portion of a data/control signal section of a superframe of the first network to the second network; and transmitting a beacon via the allocated portion of the data/control signal section by a predetermined device of the second network.

According to another aspect of the present invention, there is provided a method of transmitting a beacon in a case where two networks are combined, the method comprising: allocating a section to one of the two networks in a beacon period of a superframe, wherein the section is for transmitting a beacon subsequently to a section allocated to the other network; and transmitting a beacon via the allocated section by a predetermined device of the network to which the section for transmitting a beacon is allocated.

According to another aspect of the present invention, there is provided a method of transmitting a beacon in a case where a first network operated in a centralized beaconing scheme and a second network operated in a distributed beaconing scheme are combined, the method comprising: receiving from a network coordinator of the first network a beacon via a beacon period of a superframe; and relaying the beacon to the second network via a portion of a data/control signal section of the superframe.

Advantageous Effects

According to the present invention, an optimum network operating method for a network condition is selected, thereby increasing the transmission efficiency and the controlling efficiency of a network of a wireless personal area network (WPAN). That is, the inefficiency of network management, which is caused due to a fixed beaconing method in a conventional communication system, is eliminated by converting a beaconing method according to network conditions, thereby maintaining an optimum network status.

BRIEF DESCRIPTION OF DRAWINGS

The above and other features and advantages of the present invention will become more apparent by describing in detail exemplary embodiments thereof with reference to the attached drawings in which.

BEST MODE FOR CARRYING OUT THE INVENTION

According to an aspect of the present invention, there is provided a method of transmitting a beacon in a case in which two networks are combined, the method comprising: selecting a predetermined device of one of the two networks as a network coordinator of the whole network in which the two networks are combined; and transmitting a beacon by the selected network coordinator via a beacon period to the two networks.

According to another aspect of the present invention, there is provided a method of transmitting a beacon in a case where a second network is combined as a neighbor network to a first network, the method comprising: allocating a portion of a data/control signal section of a superframe of the first network to the second network; and transmitting a beacon via the allocated portion of the data/control signal section by a predetermined device of the second network.

According to another aspect of the present invention, there is provided a method of transmitting a beacon in a case where two networks are combined, the method comprising: allocating a section to one of the two networks in a beacon period of a superframe, wherein the section is for transmitting a beacon subsequently to a section allocated to the other network; and transmitting a beacon via the allocated section by a predetermined device of the network to which the section for transmitting a beacon is allocated.

According to another aspect of the present invention, there is provided a method of transmitting a beacon in a case where a first network operated in a centralized beaconing scheme and a second network operated in a distributed beaconing scheme are combined, the method comprising: receiving from a network coordinator of the first network a beacon via a beacon period of a superframe; and relaying the beacon to the second network via a portion of a data/control signal section of the superframe.

Mode for the Invention

The present invention will now be described more fully with reference to the accompanying drawings, in which exemplary embodiments of the invention are shown.

Figure 1:
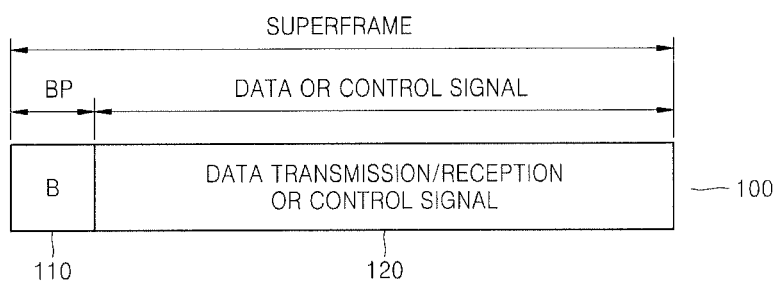
FIG. 1 is a schematic view illustrating a conventional centralized beaconing scheme.
Figure 2:
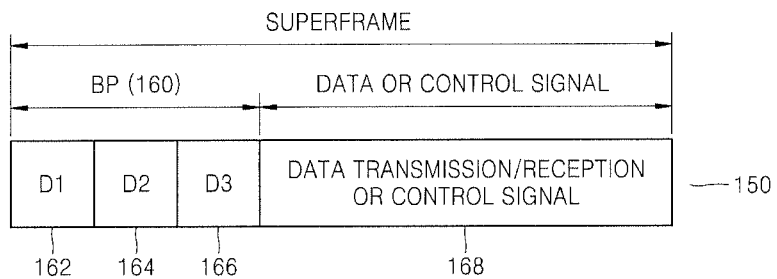
FIG. 2 is a schematic view illustrating a conventional distributed beaconing scheme.
Figure 3:
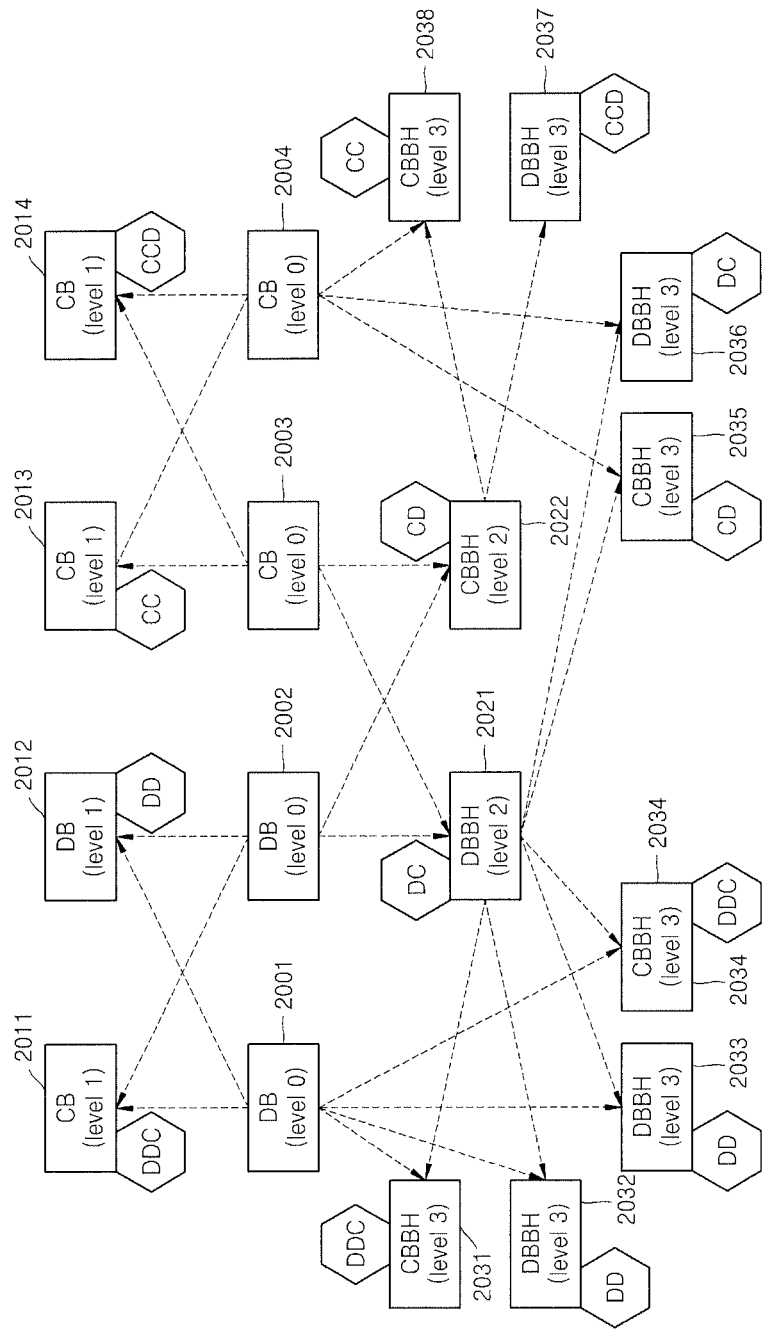
FIG. 3 illustrates an example of various beaconing methods which are generated by combining a centralized beaconing scheme and a distributed beaconing scheme.

FIG. 3 illustrates an example of various beaconing methods which are generated by the combination of a centralized beaconing scheme and a distributed beaconing scheme.

Referring to FIG. 3, as networks operated using predetermined beaconing methods are combined and form new networks, new generation networks with their corresponding characteristics are determined.

First, zero-generation networks (2001-2004) are operated using a distributed beaconing scheme (DB) and a centralized beaconing scheme (CB), respectively.

First-generation networks (2011-2014) are generated by combining networks operated using an identical operation. The first-generation networks may select a network operating method according to a network condition, irrespective of the network operating method of the zero-generation network. For example, a first-generation network generated by combining a CB network and another CB network may be operated not only according to a CB method but also according to a DB method.

According to the current embodiment, for convenience of description, a network that is formed by combining a CB network and another CB network and is operated using a CB scheme is referred to as "CC" and a network that is formed by combining a DB network and another DB network and is operated using a DB scheme is referred to as "DD" a network that is formed by combining a CB network and another CB network and is operated using a DB scheme is referred to as "CCD" a network that is formed by combining a DB network and another DB network and is operated using a CB scheme is referred to as "DDC" a network that is formed by combining a CB network and a DB network and is operated using a CB scheme is referred to as "CD" and a network that is formed by combining a CB network and a DB network and is operated using a DB scheme is referred to as "DC".

Second-generation networks (2021-2022) are generated by combining a CB network and a DB network. That is, a second-generation network is a DC network or a CD network. Third generation networks (2031-2038) are generated by combining a second-generation network and a zero-generation network. That is, a third generation network is a DDC, CCD, DD, CC, CD, or DC network.

As described above, by combining a CB network and a DB network in FIG. 3, six networks may be generated including second and third generation centralized beaconing beacon hybrid (CBBH) and distributed beaconing beacon hybrid (DBBH) networks.

Figure 4:
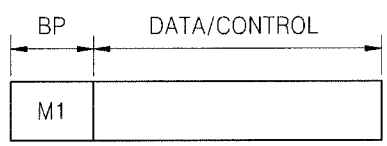
FIGS. 4 through 6 are schematic views illustrating a superframe structure of a CC network which is formed by combining a centralized beaconing (CB) network and a CB network and is operated in a CB scheme.
Figure 5:
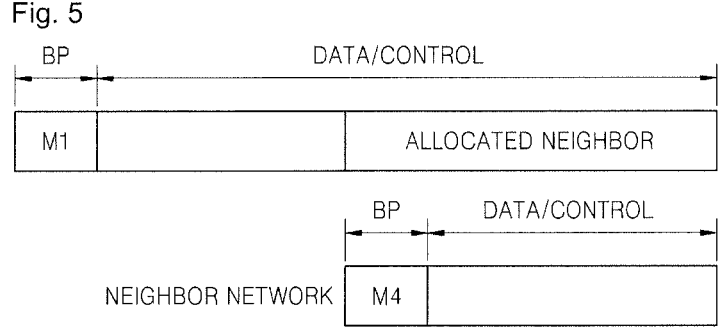
Figure 6:
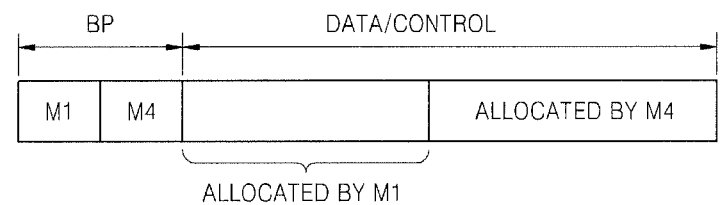

FIGS. 4 through 6 illustrate an example of a superframe structure of a CC network that is formed by combining a CB network and a CB network and is operated in a CB scheme.

Referring to FIG. 4, a superframe is formed to a CB network in which two CB superframes are combined and controlled by a device M1. Accordingly, in the CC network, the device M1 transmits a beacon through a front section of the superframe.

In the superframe illustrated in FIG. 5, when two CB networks are combined, one of the CB networks is set as a neighbor network of the other and operated as a dependent network. The neighbor network among the two CB networks transmits a data/control signal within the network via a portion of a data/control signal transmission section of the superframe.

Referring to FIG. 6, two CB networks are operated in a CB scheme, respectively. However, the superframe structure is similar to that of a DB network in that a beacon period is consecutively used within one superframe. That is, a predetermined device M1 of a first CB network and a predetermined device M4 of a second CB network are each operated in a CB scheme but the two predetermined devices M1 and M4 transmit a beacon via a BP of one superframe.

Figure 7:
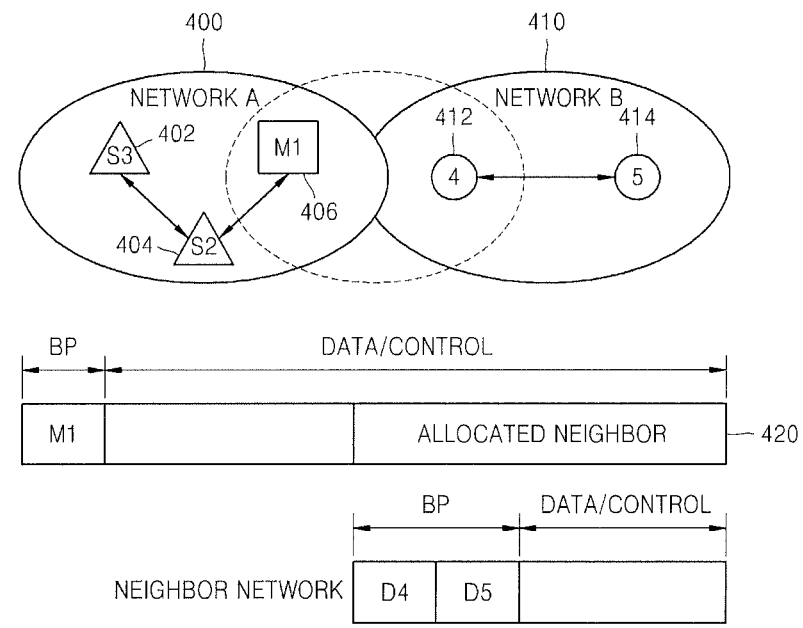
FIGS. 7 through 9 are schematic views illustrating a superframe structure of a CD network which is formed by combining a CB network and a distributed beaconing (DB) network and is operated in a CB scheme.
Figure 8:
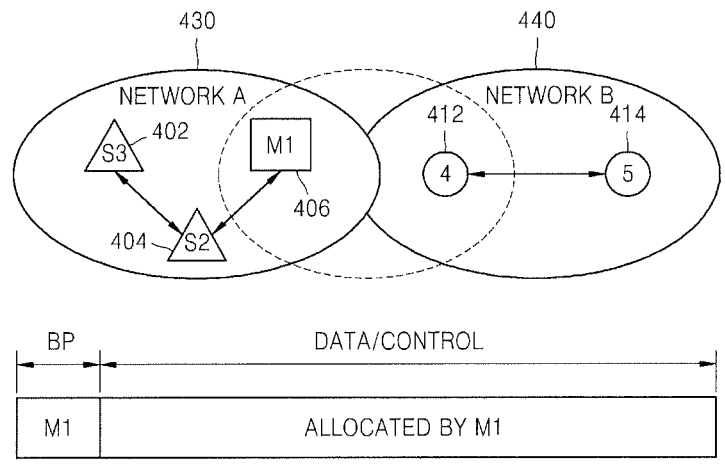
Figure 9:
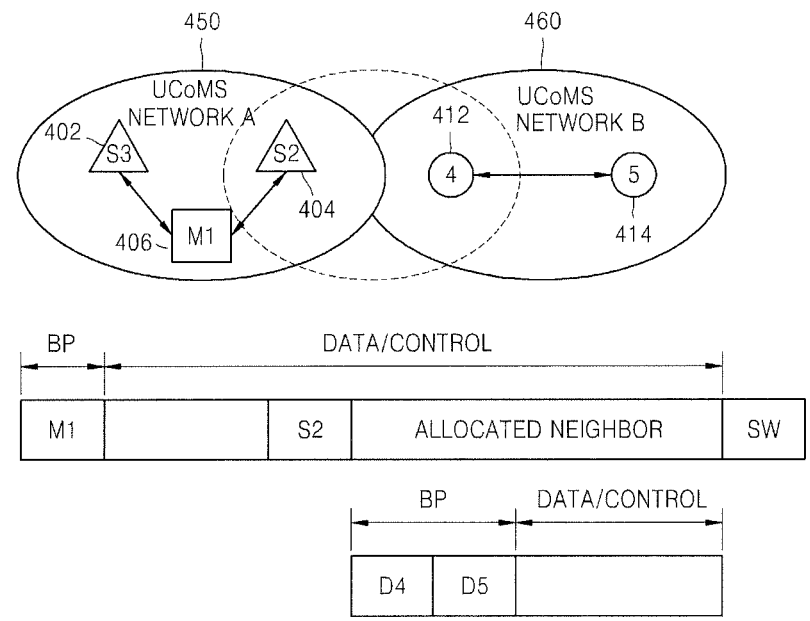

FIGS. 7 through 9 illustrate a superframe structure in a CD network which is formed by combining a CB network and a DB network and is operated in a CB scheme.

In FIGS. 7 through 9, devices 412 and 414 which are illustrated as circles denote devices operated in a DB scheme, and a device illustrated as a square denotes a network coordinator 406 of a CB network, and devices 402 and 404 illustrated as triangles denote slave devices S3 and S2 controlled by the network coordinator 406.

FIG. 7 illustrates a case where a DB network, a Network B 410, is combined as a neighbor network of a CB network, a network A 400. The network B 410 is operated by receiving an allocated time in a neighbor period 420 in the superframe structure and is operated under the control of the network coordinator 406.

FIG. 8 illustrates a superframe structure when two networks A 430 and B 440 are combined and two devices 412 and 414 of the Network B 440 operated in a DB scheme are combined as slave devices under the control of the network coordinator 406 of the whole network. In this case, the network coordinator 406 of the Network A 430 transmits a beacon.

Referring to FIG. 9, when a beacon of the network coordinator 406 does not arrive at an adjacent network 460, a slave device S2 404 relays a beacon in-between during a data slot.

Figure 10:
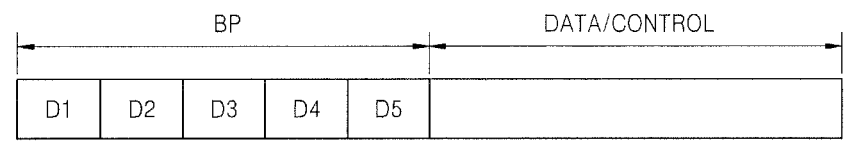
FIG. 10 illustrates a superframe structure of a network that is operated in a DB scheme.
Figure 11:
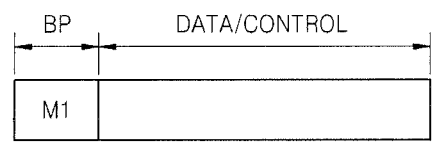
FIG. 11 illustrates a superframe structure in a case where one device is selected as a network coordinator in a DB network of FIG. 10 and a DB network is operated in a CB scheme.

FIG. 10 illustrates a superframe structure of a network operated in a DB scheme, and FIG. 11 illustrates a superframe structure in a DB network in which one device is selected as a network coordinator and is operated in a CB scheme.

FIG. 10 is an example of a general DB network, in which each device of the DB network transmits a beacon via a beacon period BP. When the general DB network is operated in a CB scheme, a predetermined device M1 is selected as a network coordinator in a DB network, and if the device M1 only transmits a beacon via a beacon period BP of a superframe, other devices receive the beacon and are operated according to the beacon.

Figure 12:
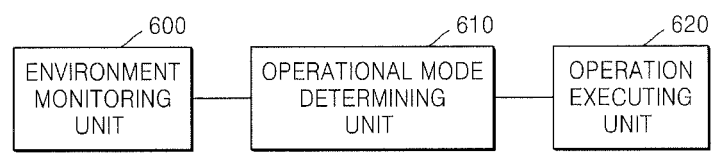
FIG. 12 illustrates a block diagram of a hybrid beaconing controlling apparatus that controls a hybrid beaconing method, according to an embodiment of the present invention.

FIG. 12 is a block diagram of a hybrid beaconing controlling apparatus controlling a hybrid beaconing method, according to an embodiment of the present invention.

Referring to FIG. 12, the hybrid beaconing controlling apparatus includes an environment monitoring unit 600, an operational mode determining unit 610, and an operation executing unit 620.

The environment monitoring unit 600 pursuits network environments and collects parameters. The environment monitoring unit 600 may detect the efficiency of a network by monitoring environments by using various conventional methods.

The operational mode determining unit 610 determines an efficient operational mode of a network based on the parameters collected by the environment monitoring unit 600. That is, the operational mode determining unit 610 determines an operational mode of an optimum network to operate a network, that is, whether an optimum network is a DDC, CCD, DD, CC, CD, or DC network, based on the results detected by the environment monitoring unit 600.

The operation executing unit 620 operates a network by using the above-described superframe structure according to the determined operational mode of an optimum network.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a beacon in a case in which two networks are combined, the method comprising:
    forming a network, by combining the two networks, to select a predetermined device of one of the two networks as a network coordinator of the combined network, wherein one of the two networks is operated in a centralized beaconing scheme, and the other is operated in a distributed beaconing scheme; and
    transmitting a beacon in a centralized beaconing scheme by the selected network coordinator via a beacon period to the two networks.

2. The method of claim 1, wherein the two networks are operated in a central beaconing scheme in which a network coordinator transmits a beacon, and one of network coordinators which respectively operate the two networks in a centralized beaconing scheme is selected as a predetermined device.

3. The method of claim 1, wherein a predetermined device of one of the two networks is selected as the network coordinator, a network coordinator of the network operated in the centralized beaconing scheme is selected as the network coordinator of the whole network.

4. A method of transmitting a beacon in a case where a second network is combined as a neighbor network to a first network, the method comprising:
    allocating a portion of a data/control signal section of a superframe of the first network to the second network, wherein one of the two networks is operated in a centralized beaconing scheme, and the other is operated in a distributed beaconing scheme; and
    transmitting a beacon in a centralized beaconing scheme via the allocated portion of the data/control signal section by a predetermined device of the second network.

5. The method of claim 4, wherein the first and second networks are operated in a centralized beaconing scheme in which all network coordinators transmit a beacon.

6. The method of claim 4, wherein the first network is operated in a centralized beaconing scheme, and
    the second network is operated in a distributed beaconing scheme, and
    the transmitting of a beacon comprises sequentially transmitting a beacon by devices in the second network via the allocated portion.

7. A method of transmitting a beacon in a case in which two networks are combined, the method comprising:
    forming a network, by combining the two networks, wherein one of the two networks is operated in a centralized beaconing scheme, and the other is operated in a distributed beaconing scheme;

allocating a section to one of the two networks in a beacon period of a superframe, wherein the section is for transmitting a beacon subsequently to a section allocated to the other network; and transmitting a beacon in a centralized beaconing scheme via the allocated section by a predetermined device of the network to which the section for transmitting a beacon is allocated.

8. The method of claim 7, further comprising allocating a data/control signal transmission section to one of the two networks in a data/control signal transmission section of the superframe, wherein the data/control signal transmission section is subsequent to a section allocated to the other network.

9. The method of claim 7, wherein the two networks are operated in a centralized beaconing scheme in which all network coordinators transmit a beacon.

10. A method of transmitting a beacon in a case in which two networks are combined, the method comprising:

forming a network, by combining the two networks, wherein one of the two networks is operated in a centralized beaconing scheme, and the other is operated in a distributed beaconing scheme;

receiving from a network coordinator of a first network a beacon via a beacon period of a superframe; and relaying the beacon in a centralized beaconing scheme to a second network via a portion of a data/control signal section of the superframe.

11. The method of claim 10, further comprising allocating a portion of the data/control signal section of the superframe to the second network.

12. The method of claim 10, further comprising transmitting a beacon sequentially via the allocated portion of the data/control signal section by devices in the second network.

* * * * *